United States Patent
Raghunathan et al.

(10) Patent No.: US 10,891,412 B1
(45) Date of Patent: Jan. 12, 2021

(54) OFFLINE ANALYSIS OF HIERARCHICAL ELECTRONIC DESIGN AUTOMATION DERIVED DATA

(71) Applicant: International Business Machines Corporation, Armonk, NY (US)

(72) Inventors: Sheshashayee K. Raghunathan, Bangalore (IN); Thomas S. Guzowski, Essex, VT (US); Nathan Buck, Underhill, VT (US); Kerim Kalafala, Rhinebeck, NY (US); Jack DiLullo, Austin, TX (US); Debra Dean, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/789,912

(22) Filed: Feb. 13, 2020

(51) Int. Cl.
*G06F 30/3315* (2020.01)
*G06F 16/21* (2019.01)
*G06F 30/31* (2020.01)
*G06F 119/06* (2020.01)
*G06F 119/12* (2020.01)

(52) U.S. Cl.
CPC ........ *G06F 30/3315* (2020.01); *G06F 16/212* (2019.01); *G06F 30/31* (2020.01); *G06F 2119/06* (2020.01); *G06F 2119/12* (2020.01)

(58) Field of Classification Search
CPC .... G06F 30/3315; G06F 16/212; G06F 30/31; G06F 2119/06; G06F 2119/12
USPC ........................................................ 716/102
See application file for complete search history.

(56) References Cited

U.S. PATENT DOCUMENTS

| | | | |
|---|---|---|---|
| 5,734,899 A * | 3/1998 | Yoshizawa | ................ G06F 8/71 |
| 7,155,691 B2 | 12/2006 | Ratzlaff | |
| 7,487,486 B2 | 2/2009 | Celik et al. | |
| 7,937,678 B2 | 5/2011 | Lippmann et al. | |

(Continued)

FOREIGN PATENT DOCUMENTS

WO        03050724 A2     6/2003

OTHER PUBLICATIONS

Babul Anunay "Hierarchical timing concepts" EDN <URL: https://www.edn.com/hierarchical-timing-concepts/> Oct. 25, 2013 (11 pages).

(Continued)

*Primary Examiner* — Suresh Memula
(74) *Attorney, Agent, or Firm* — Cantor Colburn LLP; Erik Johnson (57) ABSTRACT

An electronic design automation (EDA) data processing system includes a version graph database and a controller. The version graph database stores a plurality of different versions of graph data sets. Each graph data set corresponds to a respective circuit component located at a given hierarchical level of a semiconductor chip design and each graph data set tagged with a version identifier (ID) indicating the version thereof. The controller determines a hierarchical circuit included in the semiconductor chip and determines a plurality of targeted circuit components that define the hierarchical circuit. The controller determines targeted graph data sets from the versions graph database that correspond to the targeted circuit components, and obtains the targeted graph data sets having matching version IDs such that the targeted graph data sets are the same version.

20 Claims, 8 Drawing Sheets

(56) References Cited

U.S. PATENT DOCUMENTS

| | | | |
|---|---|---|---|
| 7,992,116 B2 | 8/2011 | Chang | |
| 8,255,860 B1 | 8/2012 | Fung | |
| 2006/0111884 A1* | 5/2006 | McGaughy | G06F 30/367 |
| | | | 703/14 |
| 2009/0055786 A1 | 2/2009 | Chang | |
| 2015/0338224 A1* | 11/2015 | Geisberger | G01C 21/3446 |
| | | | 701/527 |
| 2016/0259832 A1* | 9/2016 | Shore | G06F 16/9024 |
| 2017/0039253 A1* | 2/2017 | Bond | G06F 16/2474 |
| 2018/0268078 A1* | 9/2018 | Gianetto | G06F 16/2365 |
| 2019/0339967 A1* | 11/2019 | Moondhra | G06F 8/433 |
| 2020/0175071 A1* | 6/2020 | Ogrinz | G06F 16/245 |

OTHER PUBLICATIONS

Gandhi et al. "Hierarchical Timing Analysis: Pros, Cons, and a New Approach" Cadence <URL: https://www.cadence.com/content/dam/cadence-www/globalten_US/documents/tools/digital-design-signoff/hierarchical-timing-analysis-wp.pdf> [retrieved: Feb. 11, 2020] (7 pages).

Li et al., "On timing model extraction and hierarchical statistical timing analysis" IEEE Transactions on Computer-Aided Design of Integrated Circuits and Systems 32.3 (Feb. 14, 2013) pp. 367-380.

Schulte et al., "Tonic: A timing database for VLSI design." Proceedings of EURO-DAC 93 and EURO-VHDL 93-European Design Automation Conference. IEEE, Sep. 20, 1993 (pp. 426-431).

Wang et al., "An In-Depth Benchmarking Study on Bill of Materials for High-End Manufacturing" International Conference on Conceptual Modeling. Springer, Cham, Oct. 22-25, 2018 (pp. 75-76).

* cited by examiner

OFFLINE ANALYSIS OF HIERARCHICAL ELECTRONIC DESIGN AUTOMATION DERIVED DATA

BACKGROUND

The present invention relates generally to integrated circuit design and fabrication, and more particularly, to a method, system, and computer program employing electronic design automation to design and fabricate integrated circuits.

Electronic Design Automation (EDA) applications span several facets of semiconductor chip design including, but not limited to, logic synthesis, functional verification, physical synthesis, design closure, analysis (timing, power, signal integrity), and checking. Present-day microprocessors and other ASIC chip designs are very large and complex, which is exacerbated by constraints posted by deep submicron technologies. To handle the underlying complexity, EDA applications are typically run on high performing servers that have significant storage capacity. In such an environment, designers have two primary ways of ingesting the results of their runs; either through interacting with live runs or through results written to databases/output files.

SUMMARY

According to a non-limiting embodiment of the present invention, an electronic design automation (EDA) data processing system includes a version graph database and a controller. The version graph database stores a plurality of different versions of graph data sets. Each graph data set corresponds to a respective circuit component located at a given hierarchical level of a semiconductor chip design and each graph data set tagged with a version identifier (ID) indicating the version thereof. The controller determines a hierarchical circuit included in the semiconductor chip and determines a plurality of targeted circuit components that define the hierarchical circuit. The controller determines targeted graph data sets from the versions graph database that correspond to the targeted circuit components, and obtains the targeted graph data sets having matching version IDs such that the targeted graph data sets are the same version.

According to another non-limiting embodiment of the present invention, a computer implemented method is provided for diagnosing a semiconductor chip design. The method comprises generating a graph data set corresponding to a respective circuit component located at a given hierarchical level of a semiconductor chip design, tagging the graph data set with a version identifier (ID) indicating a version of the graph data set, and storing, in a version graph database, the graph data set with the version identifier (ID) such that a plurality of different versions of graph data sets are stored in the version graph database. The method further comprises determining, via a controller, a hierarchical circuit included in the semiconductor chip and determining a plurality of targeted circuit components that define the hierarchical circuit; determining, via the controller, targeted graph data sets from the versions graph database that correspond to the targeted circuit components, and obtaining, via the controller, the targeted graph data sets having matching version IDs such that the targeted graph data sets are the same version. The method further comprises stitching together the targeted graph data sets, via the controller, to generate a hierarchical graph representing the hierarchical circuit.

According to yet another non-limiting embodiment of the present invention, a computer program product is provided for diagnosing a semiconductor chip design. The computer program product comprises a computer readable storage medium having program instructions embodied therewith, the program instructions executable by a processor to perform a method comprising operations of generating a graph data set corresponding to a respective circuit component located at a given hierarchical level of a semiconductor chip design, and tagging the graph data set with a version identifier (ID) indicating a version of the graph data set. The method further comprises storing, in a version graph database, the graph data set with the version identifier (ID) such that a plurality of different versions of graph data sets are stored in the version graph database, determining, via a controller, a hierarchical circuit included in the semiconductor chip and determining a plurality of targeted circuit components that define the hierarchical circuit, and determining, via the controller, targeted graph data sets from the versions graph database that correspond to the targeted circuit components, and obtaining, via the controller. The targeted graph data sets having matching version IDs such that the targeted graph data sets are the same version.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, designers typically ingest the results of their runs either through interacting with live runs or through results written to databases/output files. In the domain of analytics, designers frequently work with offline data that is generated from multiple independent timing runs, oftentimes performed by several different entities and is organized using a graph database format. The offline data must then be subsequently stitched together to construct a consistent hierarchical view of the most up-to-date offline data that can then be used to perform a cross hierarchy analysis and diagnose the design of the semiconductor chip.

A limitation encountered when performing a cross hierarchy analysis is that different levels of hierarchies tend to spin or run at different rates. For example, macro timings are the fastest, followed by unit timings, and then the chip timing being the slowest. In addition, a single macro may exist a multiple levels of the chip hierarchy. During the design of the chip, however, the macro itself may undergo different design changes resulting in different versions of the macro. Consequently, one version of the macro may exist at a first level while a different second version may exist at a second level. Therefore, there is a possibility of stitching together offline data provided by two different versions of the macro, which in turn causes an undesirable inaccurate cross hierarchy analysis.

One or more non-limiting embodiments of the present invention aim to solve the limitations noted above by providing an electronic design automation (EDA) data processing system configured to analyze EDA data in a persistent graph format by generating a hierarchical graph. The hierarchical graph connects multiple independently generated graph data sets within a hierarchy. Assembly of multiple independently generated data sets can be performed in a version-aware fashion.

For example, if a given level of hierarchy H which has multiple versions (e.g., one version representing the timing data for the most recent implementation of H, another representing a previous implementation of the H, and so forth), each version of H will correspond to an independently generated graph data set. Furthermore, for an instance H_i and version v_i thereof of H used with a parent level of hierarchy P, H_i will be assembled in to hierarchical graph for P using an independently generated graph set of H corresponding to version v_i. In one or more non-limiting embodiments, the hierarchical graph includes a sub-graph representing a given component (e.g., macro, unit, chip) and given version thereof, and each sub-graph includes nodes that are connected via a parent/child relationship. In this manner, the EDA data processing system can traverse the hierarchical graph to determine a metric (e.g., timing run) generated from the same version of a given component. The EDA data processing system can then utilize the computed metric to perform an accurate cross hierarchy analysis.

Figure 1:
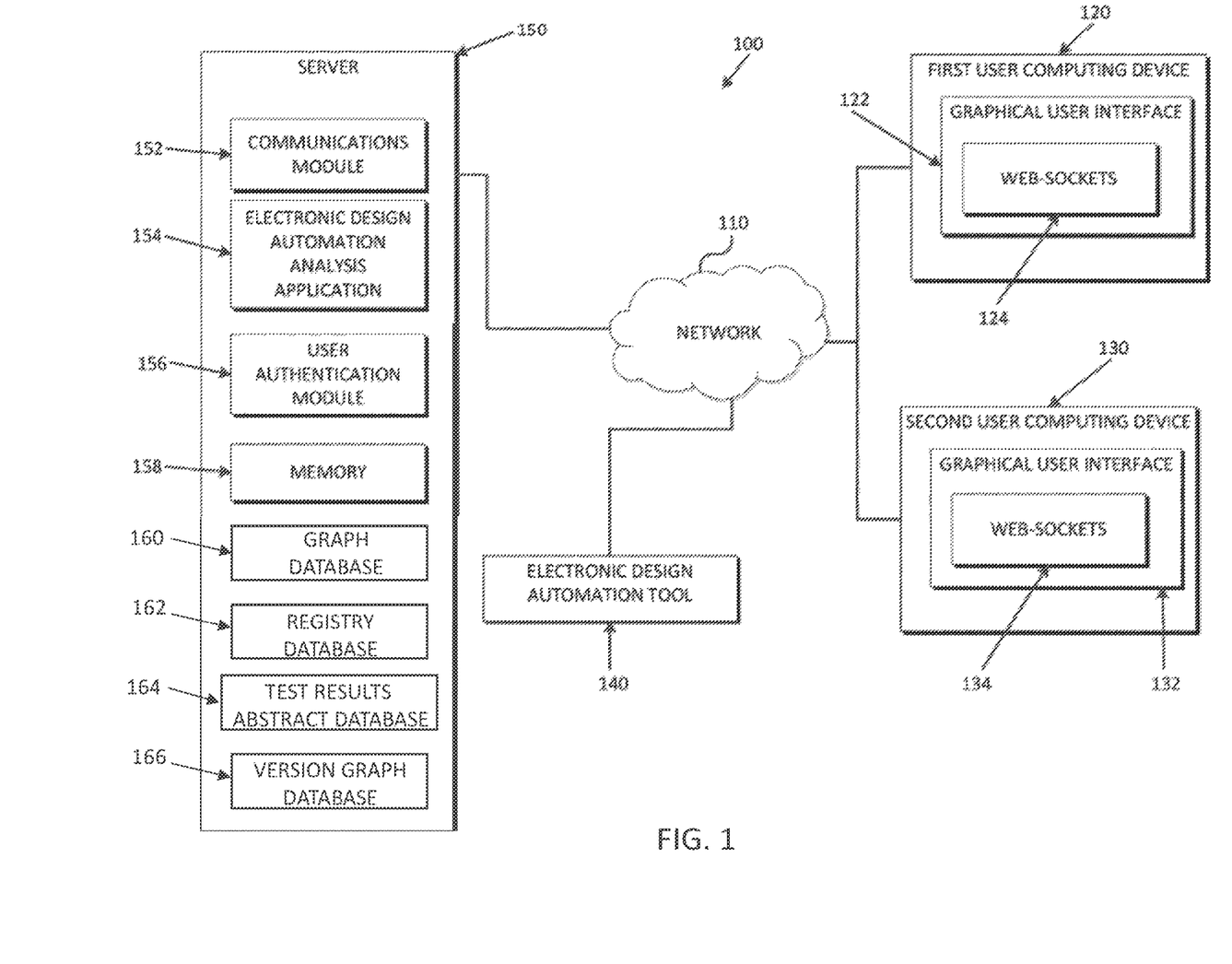
FIG. 1 is a block diagram illustrating a distributed electronic design automation (EDA) data processing system according to a non-limiting embodiment of the invention.

With reference now to FIG. 1, a distributed EDA data processing system 100 is illustrated according to a non-limiting embodiment of the invention. The EDA data processing environment 100 includes a first user computing device 120, a second user computing device 130, an EDA tool 140, and a server 150. The first user computing device 120, second user computing device 130, EDA tool 140, and server 150 can each communicates with one another via a network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the first user computing device 120, the second user computing device 130, EDA tool 140, and server 150, in accordance with one or more embodiments of the invention.

The first user computing device 120 and the second user computing device 130 can contain the same components and can have the same functions. The first user computing device 120 and the second user computing device 130 represent computing devices that include a user interface such as, for example, graphical user interfaces 122 and 132. The graphical user interfaces 122 and 132 can be any type of application that contains the necessary web-sockets 124, 134, to access the EDA analysis application 154 located on the server 150. The application 154 can be a web application, a graphical application, an editing application or any other type of application/program that allows a user to upload, change, delete, alter, or update data accessible to the EDA analysis application 154. Furthermore, the web-sockets 124, 134 can be included within the communications module 152, instead of being included within the graphical user interfaces 122, 132.

The first user computing device 120 and second user computing device 130 may be any type of computing devices that are capable of connecting to network 110 such as, for example, a laptop computer, tablet computer, netbook computer, personal computer (PC), a desktop computer, a smart phone, or any programmable electronic device supporting the functionality required by one or more embodiments of the invention. The first user computing device 120 and second user computing device 130 may include internal and external hardware components. In other embodiments, the server 150 may operate in a cloud computing environment.

The web-sockets 124, 134 are designed to be implemented in web browsers and web servers, but it can be used by any client or server application. Web-sockets 124, 134 can operate according to a protocol that enables interaction between a browser, graphical user interfaces 122, 132 and a server 150 with lower overheads, facilitating real-time data transfer from and to the server 150. This is made possible by providing a way for the server 150 to send content to the browser without being solicited by the client, the first user computing device 120 and the second user computing device 130, and allowing for messages to be passed back and forth while keeping the connection open. In this way, a two-way (bi-directional) ongoing communication can take place between a browser, graphical user interfaces 122, 132 and the server 150.

The EDA tool 140 is used to analyze and diagnose the state of the semiconductor chip that is being designed. The EDA tool 140 can include one or more electronic hardware controllers that include memory and a processor configured to execute algorithms and computer-readable program instructions stored in the memory. Accordingly, the EDA tool 140 can gather data on multiple functional domains like timing (chip frequency and functional correctness verification), noise (signal integrity), power (static, dynamic, peak, average), etc. The EDA tool 140 produces data by performing static and/or dynamic simulations based on the chip design. The EDA tool 140 is shown to be separate from server 150, but instead the EDA tool 140 could be contained within server 150.

The server 150 includes a communications module 152, an EDA analysis application 154, a user authentication module 156, and memory 158. The server 150 is able to communicate with the first user computing device 120 and the second user computing device 130, via network 110. Server 150 may include internal and external hardware components. In other embodiments, the server 150 can include internal and external hardware components and can operate in a cloud computing environment.

The communications module 152 establishes communication between the first user computing device 120, the second user computing device 130 and the server 150. The communications module 152 can include the web-sockets 124, 134, as described above. The communications module 152 establishes a parallel communications between EDA analysis application 154 and the first user computing device 120, the second user computing device 130. The communications module 152 can establish communications using either forked processing or threaded processing.

Threading and forking are two popular methods for parallel processing. In forking, separate child processes are created. Fork is a process that looks exactly like the old or the parent process, but still it is a different process with a different process ID and having its own memory. The parent process creates a separate address space for a child process. Both parent and child process possess the same code segment, but execute independently from each other.

An example of forking is when a command is executed on a shell of a unix/linux system. Each time a user issues a command, the shell forks a child process and the task is executed. When a fork system call is issued, a copy of all the pages corresponding to the parent process is created, loaded into a separate memory location by the OS for the child process, but in certain cases, this is not needed. For example, in 'exec' system calls, it is unnecessary to copy the parent process pages, as exec replaces the address space of the parent process itself.

In threading, the same process can create multiple threads to run in parallel. A thread of execution is the smallest sequence of programmed instructions that can be managed independently by a scheduler, which is typically a part of the operating system. The implementation of threads and processes differs between operating systems, but in most cases a thread is a component of a process. Multiple threads can exist within one process, executing concurrently and sharing resources such as memory, while different processes do not share these resources. In particular, the threads of a process share its executable code and the values of its variables at any given time.

Threads require less overhead than "forking" or spawning a new process because the system does not initialize a new system virtual memory space and environment for the process. While most effective on a multiprocessor system where the process flow can be scheduled to run on another processor thus gaining speed through parallel or distributed processing, gains are also found on uniprocessor systems which exploit latency in I/O and other system functions which may halt process execution.

The user authentication module 156 authenticates a user when they try to access the EDA analysis application 154. The user authentication module 156 determines that the user is able to access the application and what type of access the user is allowed.

The memory 158 is a data store that stores data generated from the EDA tool 140 and any data that a user has accessed through the EDA analysis application 154. The memory 158 further stores any changes, notes, scripts, or any other user generated information with corresponding data.

The EDA analysis application 154 analyses the data collected by the EDA tool 140 and sends the data to the graphical user interfaces 122 and 132. The results depend on the underlying EDA analysis application 154. For instance, if a timing analysis is performed, the results could include the timing slacks (meaning, which parts of the logic are expected to fail their functional and performance criteria), their distribution, the paths leading to the timing fails, the attributes causing the failure, etc. If a power analysis is performed, the results could include the overall power distribution for the chip, the peak power, the hot spots (meaning which parts of chip have a concentration of high power consuming logic) etc.

The graphical user interfaces 122 and 132 render the data through tables, charts, graphs, annotations, dynamic expansion, etc. The graphical user interfaces 122 and 132 allow the user to customize the way the data gets displayed to their screens. There are a number of visualization tools one can deploy such as tabular data, different types of plots such as scatter plot, histogram, trend lines, configurable widgets, coloring for ease of navigation, options to expand/collapse detailed info, etc. The graphical user interfaces 122 and 132 further allow for the user to generate scripts to be applied to the data, stored on the memory 158, which allows for the scripts to be accessed by multiple users. The parallel connection created by the communications module 152 allows for the user of each of the first user computing device 120 and the second user computing device 130 to view how the other user is interacting with the data.

The communications module 152 or the web-sockets 124, 134 use of the web-socket based protocol allows for designers to easily get access to the analysis results on their web server, without needing to log in to the server where the job was run from. Also, multiple users can access the same data at the same time, allowing for concurrent triage/fix-up, thus providing significant productivity improvements.

The server 150 further includes a graph database 160, a registry database 162, a test results abstract database 164, and a version graph database 166. The graph database stores graph data stitched together using proper versions of multiple independent generated graph data sets. The registry database 162 stores bill of materials (BOM) corresponding to stitched graph data. The test results abstract database 164 stores boundary test results abstract data generated by performing out-of-context test runs on a given component (e.g., a child-level component). The version graph database 166 stores graph data along with its version ID for a given component (e.g., child hierarchical level component, parent hierarchical level component, etc.).

Figure 2:
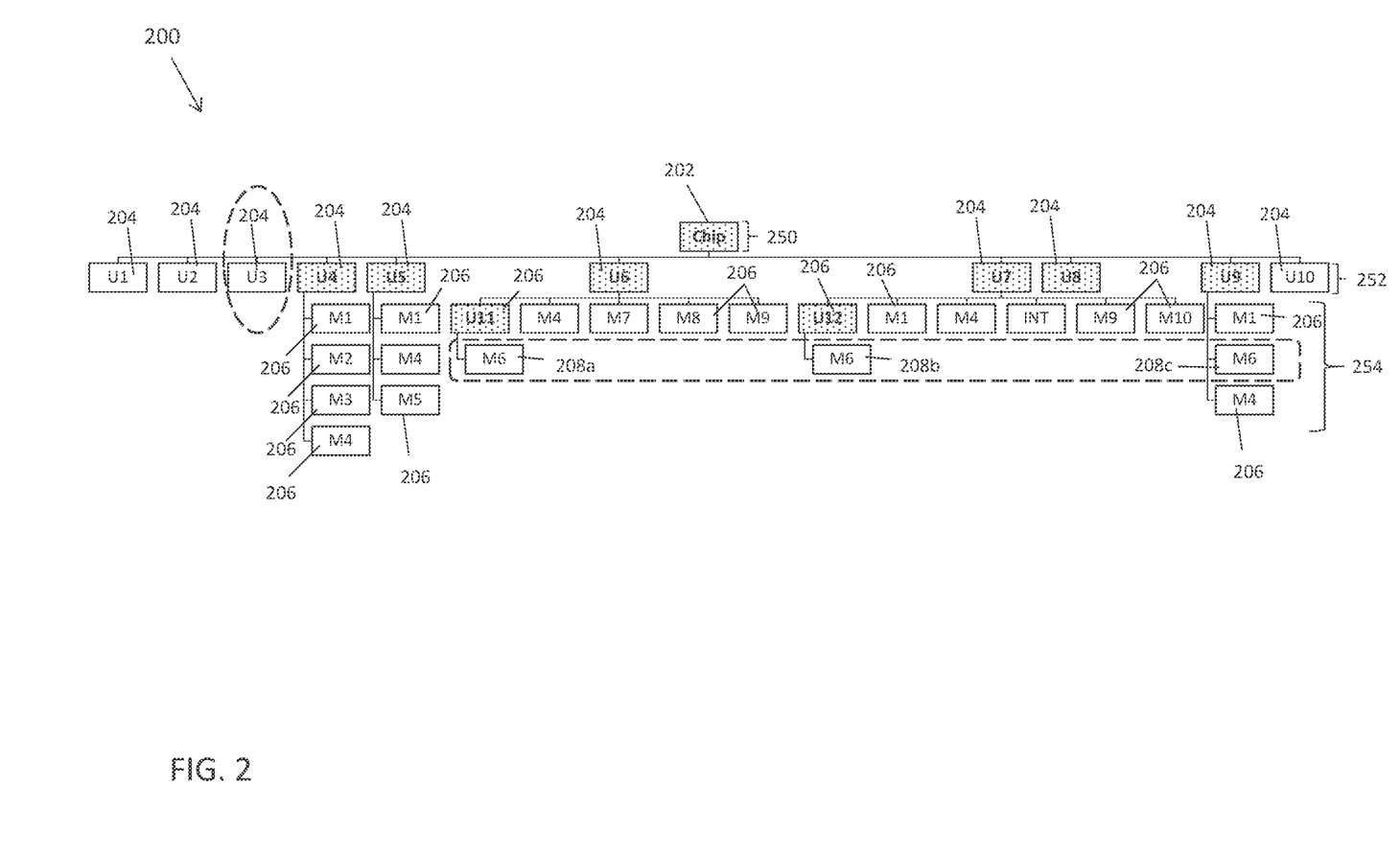
FIG. 2 is a block diagram illustrating a hierarchy of a semiconductor chip according to a non-limiting embodiment of the invention.

Turning to FIG. 2, a block diagram illustrating a hierarchy 200 of a semiconductor chip 202 is illustrated according to a non-limiting embodiment of the invention. The hierarchy 200 includes a chip level 250, a unit level 252 located below the chip level 250, and a macro level 254 located below the unit level 252. The chip level 250 contains the chip 200 and can be viewed as a parent level. The unit level 252 contains a plurality of units 204 (also referred to as unit timing abstracts), and can be viewed as a child level with respect to the chip level 250. The macro level 254 contains a plurality of macros 208 (also referred to as macro timing abstracts) and can be viewed as a child level with respect to the unit level 252 and a grandchild level with respect to the chip level 250. The units 204 and the macros 208 may include netlists (indicated as shaded blocks) and timing abstracts (indicated as non-shaded blocks).

Figure 3:
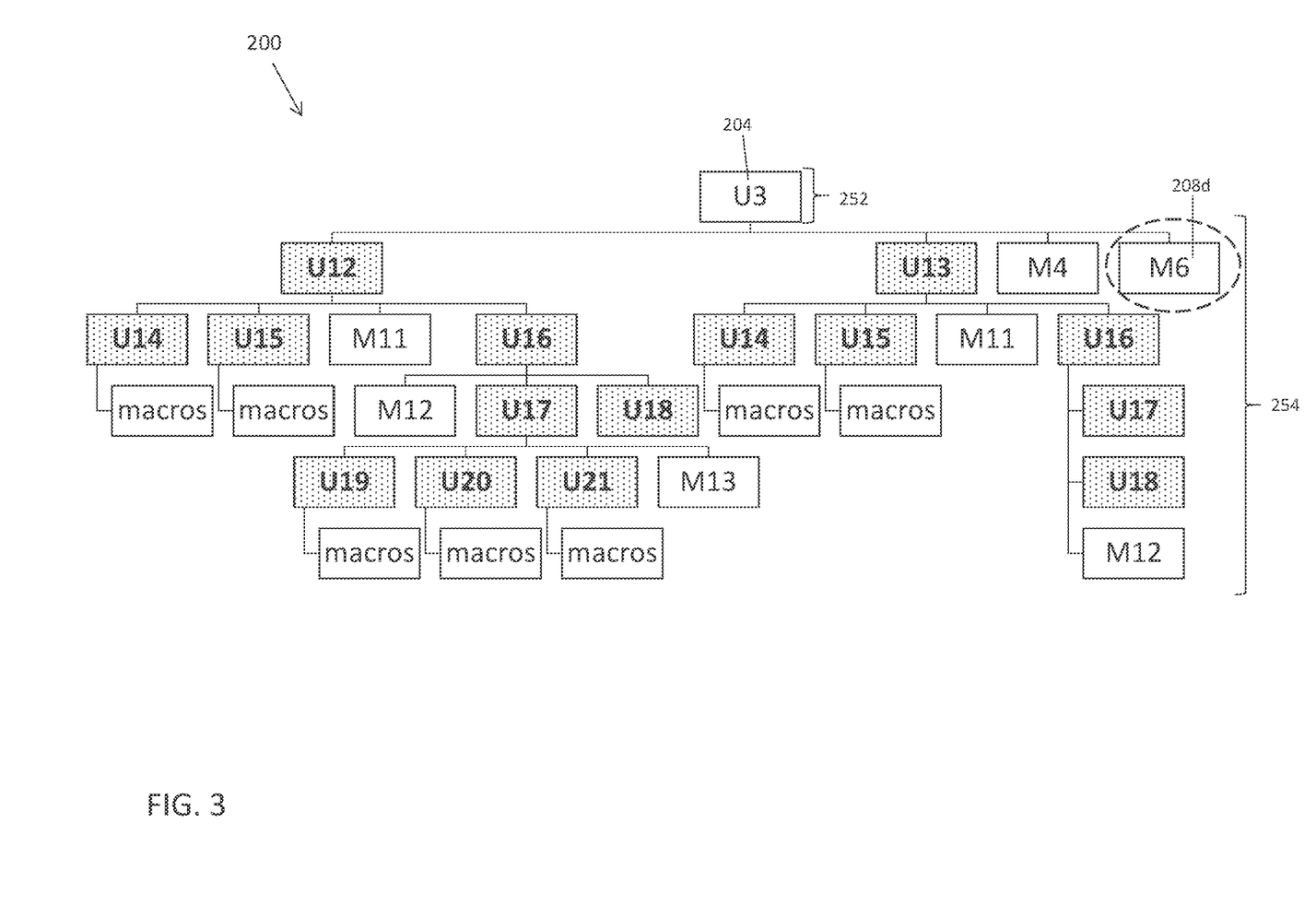
FIG. 3 is a block diagram illustrating a hierarchy of a targeted unit timing abstract of the semiconductor chip shown in FIG. 2 according to a non-limiting embodiment of the invention.

The macros may also include one or more duplicate macros 208a, 208b, and 208c (e.g. "M6"), which may be employed multiple times. One or more duplicate macros may also be located at different levels in the chip hierarchy 200. FIG. 3, for example, shows another duplicate macro 208d located in a different hierarchical level (e.g., hierarchical level 254) associated with a unit 202 (e.g., "U3") with respect to macros 208a, 208b and 208c located at hierarchical level 252. Consequently, the version of the duplicate macros 208 located at one hierarchical level may be different than one or more other duplicate macros 208 located at a different hierarchical level. In other words, one hierarchical level may contain a stale or out-of-date version of the duplicate macro 208 compared to the duplicate macro 208 located at a different hierarchical level. The EDA data processing system 100 described herein is configured to analyze EDA data in a persistent graph format by generating a hierarchical graph and determine a metric (e.g., timing run) generated from the same version of a given macro, for example. The EDA data processing system 100 can then utilize the computed metric to stitch together a consistent hierarchy that includes the proper (e.g., up-to-date) versions of the macros at each hierarchical level, which in turn can then be used to perform an accurate cross hierarchy analysis.

Figure 4:
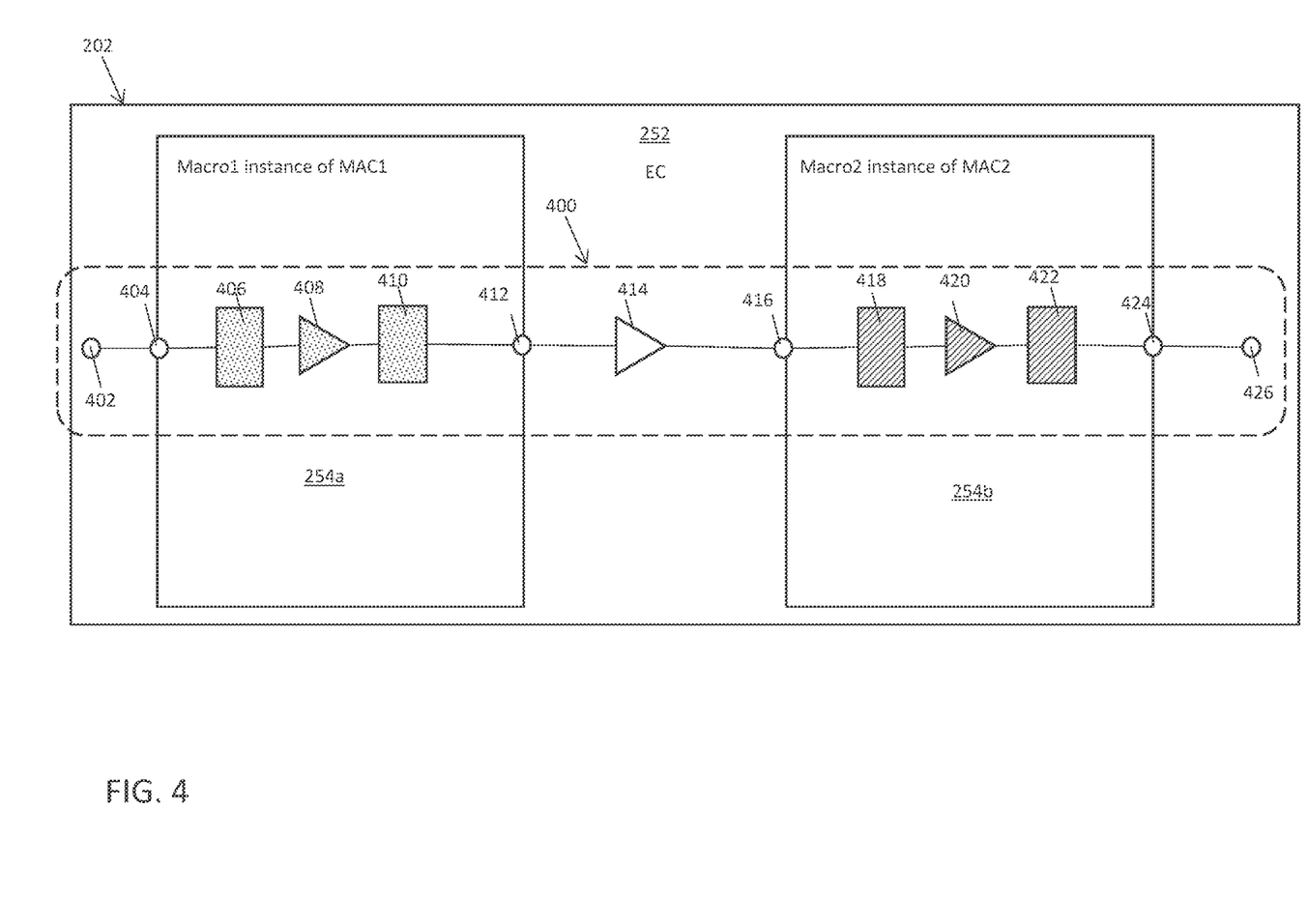
FIG. 4 is a block diagram of a hierarchical circuit of a semiconductor chip according to a non-limiting embodiment of the invention.

Referring now to FIG. 4, a hierarchical circuit 400 included in the semiconductor chip 202 (see FIG. 1) is illustrated according to a non-limiting embodiment of the invention. The hierarchical circuit 400 is established at both the unit level 252 (e.g., "U16") and the macro level 254a (e.g., "MAC1") and 254b (e.g., "MAC2"). It should be appreciated that the semiconductor chip 200 hierarchical circuit 400 can include additional hierarchical circuits that are established at different levels without departing from the scope of the invention.

The hierarchical circuit 400 includes a circuit input node 402, a first macro input 404, a first latch 406, a first buffer 408, a second latch 410, a first macro output 412, a second buffer 414, a second macro input 416, a third latch 418, an inverter 420, a fourth latch 422, a second macro output 424, and a circuit output node 426.

The circuit input node 402 is located at the unit level 252 and is coupled to the first macro input 404. The first macro input 404 provides access to the first latch 406, the first buffer 408, and the second latch 410, which are located at the macro level 252a. The output of the second latch 410 is coupled to the first macro output 412, which provides access to the second buffer 414 located at the unit level 252.

The first macro output 412, second buffer 414, and second macro input 416 can serve as higher-level logic that couples first and second macros (e.g., MAC1 and MAC2) located at the first and second macro levels 254a and 254b, respectively. For instance, the output of the second buffer 414 is coupled to the second macro input 416, which provides access to the third latch 418, the inverter 420, and the fourth latch 422 located at the second macro level 254b. The output of the fourth latch 422 is coupled to the circuit output node 426, which is located at the unit level 252. Accordingly, the components defining the hierarchical circuit 400 span several different hierarchical levels (e.g., 254a, 252, and 254b) of the chip 200. Therefore, the EDA data processing system 100 must determine that the versions of the components in the unit level 252 have the same versions with respect to the versions of the components in the macro levels 254a and 254b in order to perform an accurate analysis of the circuit 400. To do so, the EDA data processing system 100 generates a graph model that employs component labels that correspond to a given component version. The EDA data processing system 100 can then analyze the graph model to determine the correct or targeted versions of each component.

Figure 5:
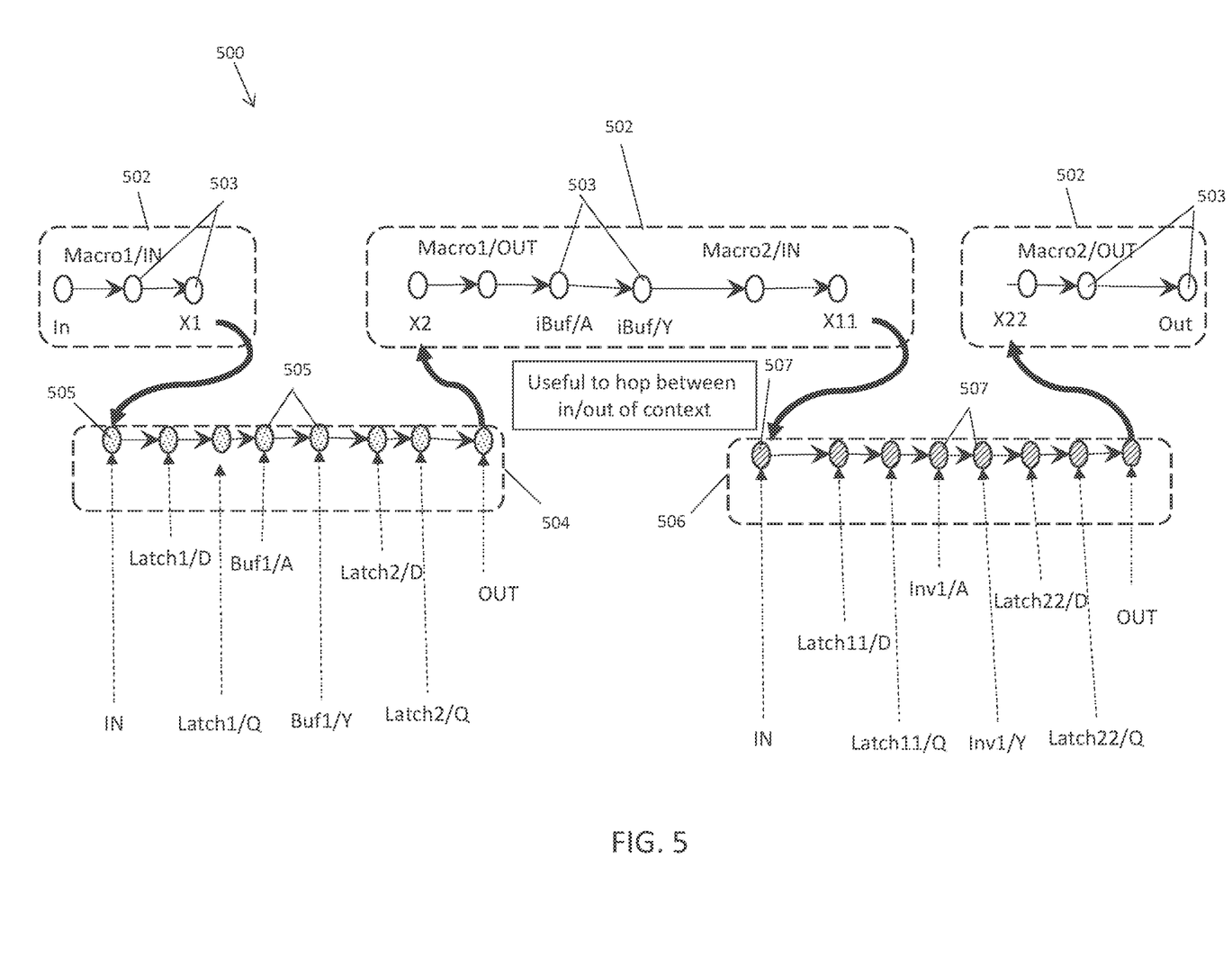
FIG. 5 is an example of a graph model stored in a graph database according to a non-limiting embodiment of the invention.

Turning to FIG. 5, an example of a graph model 500 stored in a graph database is illustrated according to a non-limiting embodiment of the invention. The graph model 500 can be generated by the EDA data processing system 100 (e.g., the EDA tool 140) and used by the EDA data processing system 100 to determine that the correct versions (e.g., most up-to-date versions) of data at each level of the chip hierarchy 200.

The graph model 500 includes three separate and independent timing graphs 502, 504 and 506. The nodes 503 included in timing graph 502 represent timing results obtained from a first timing run associated with logic and/or components located in the unit level 252 (see FIG. 4). The nodes 505 included in timing graph 504 represent timing results obtained from a second timing run associated with logic and/or components of a first macro ("MAC1") located at the macro level 245a (see FIG. 4). The nodes 507 included in timing graph 506 represent timing results obtained from a third timing run associated with logic and/or components of a second macro ("MAC2") located at the macro level 245b (see FIG. 4).

Figure 6:
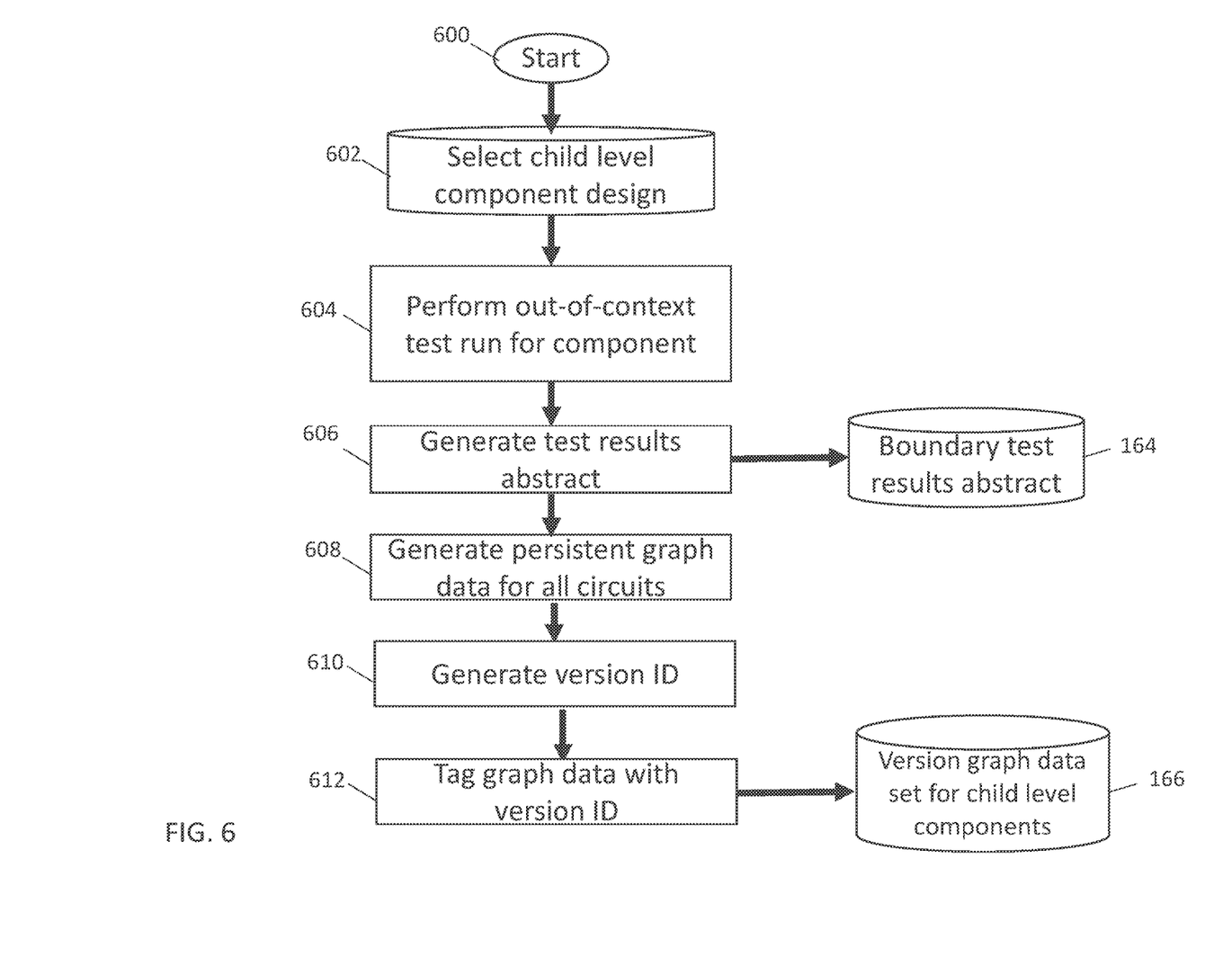
FIG. 6 is a flow diagram illustrating a method of generating a timing graph for components located at a child hierarchical level according to a non-limiting embodiment of the invention.

Referring now to FIG. 6, a method of generating a timing graph for components located at a child hierarchical level (e.g., macro level) is illustrated according to a non-limiting embodiment of the invention. The method begins at operation 600, and at operation 602 a child level component design included in a semiconductor chip design is identified via an EDA data processing system 100. The child level component design may include one or more hierarchical circuits. The hierarchical circuit(s) can include a plurality of circuit components, with one or more components located at a first hierarchical level while one or more other components are located at a second hierarchical level different from the first level.

At operation 604, the EDA data processing system 100 performs an out-of-context test run for the identified component. The out-of-context timing run refers to a test run that is performed on the identified component independently from other components present in the semiconductor chip. The test run includes, but is not limited to, a static timing analysis, a statistical timing analysis, and a power analysis. At operation 606, the EDA data processing system 100 generates test results abstract corresponding to the out-of-context test run performed on the identified component, and stores the boundary test results abstract data in test results abstract database 164 (see FIG. 1). At operation 608, the EDA data processing system 100 generates persistent child level graph data for each circuit included in the identified child level component, and at operation 610 generates a version identifier (ID). The version ID indicates a particular version of the corresponding the child level graph data. At operation 612, the EDA data processing system 100 tags the child level graph data with a version identifier (ID), and stores the graph data along with its version ID for the component located at the child hierarchical level are stored in a version graph database 166 (see FIG. 1). Accordingly, the method can return to operation 602 and identify another child level component or can end.

Figure 7:
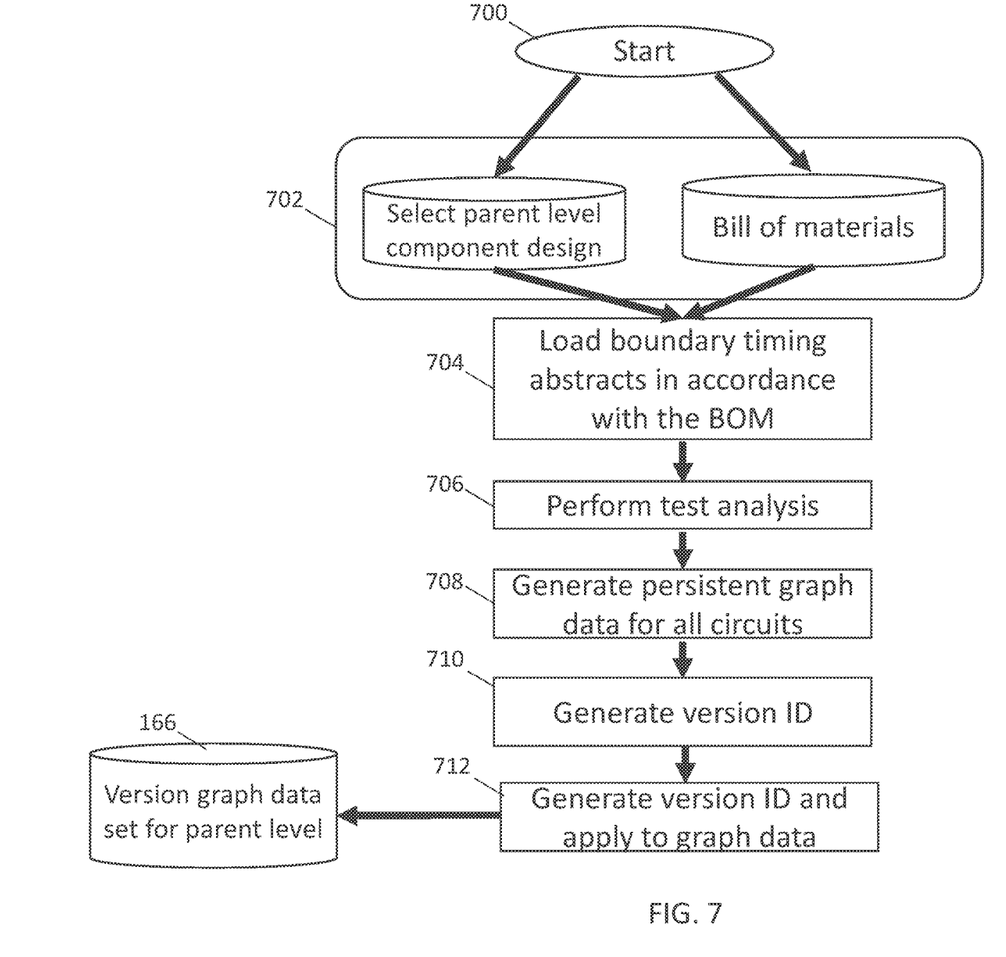
FIG. 7 is a flow diagram illustrating a method of generating a timing graph for components located at a parent hierarchical level according to a non-limiting embodiment of the invention.

Turning to FIG. 7, a method of generating a timing graph for components located at a parent hierarchical level (e.g., unit level) is illustrated according to a non-limiting embodiment of the invention. The method begins at operation 700, and at operation 702 the EDA data processing system 100 selects a parent level component design along and obtains a bill of materials (BOM) corresponding to the selected parent level component design. At operation 704, the selected parent level component design along and obtains a bill of materials (BOM) are input to the EDA data processing system 100. At operation 704, boundary timing abstracts corresponding with the BOM are input to the EDA data processing system 100.

At operation 706, the EDA data processing system 100 performs a test analysis on the input parent level component design. The test analysis includes, but is not limited to, a static timing analysis, a statistical timing analysis, and a power analysis. At operation 708, the EDA data processing system 100 generates persistent graph data for all circuits included in the parent level component. At operation 708, the EDA data processing system 100 generates persistent parent level graph data for each circuit included in the identified parent level component, and at operation 710 generates a version identifier (ID). The version ID indicates a particular version of the corresponding the parent level graph data. At operation 712, the EDA data processing system 100 tags the parent level graph data with a version identifier (ID), and stores the parent level graph data along with its version ID for the component located at the parent hierarchical level are stored in a version graph database 166. Accordingly, the method can return to operation 702 and identify another child level component or can end.

Figure 8:
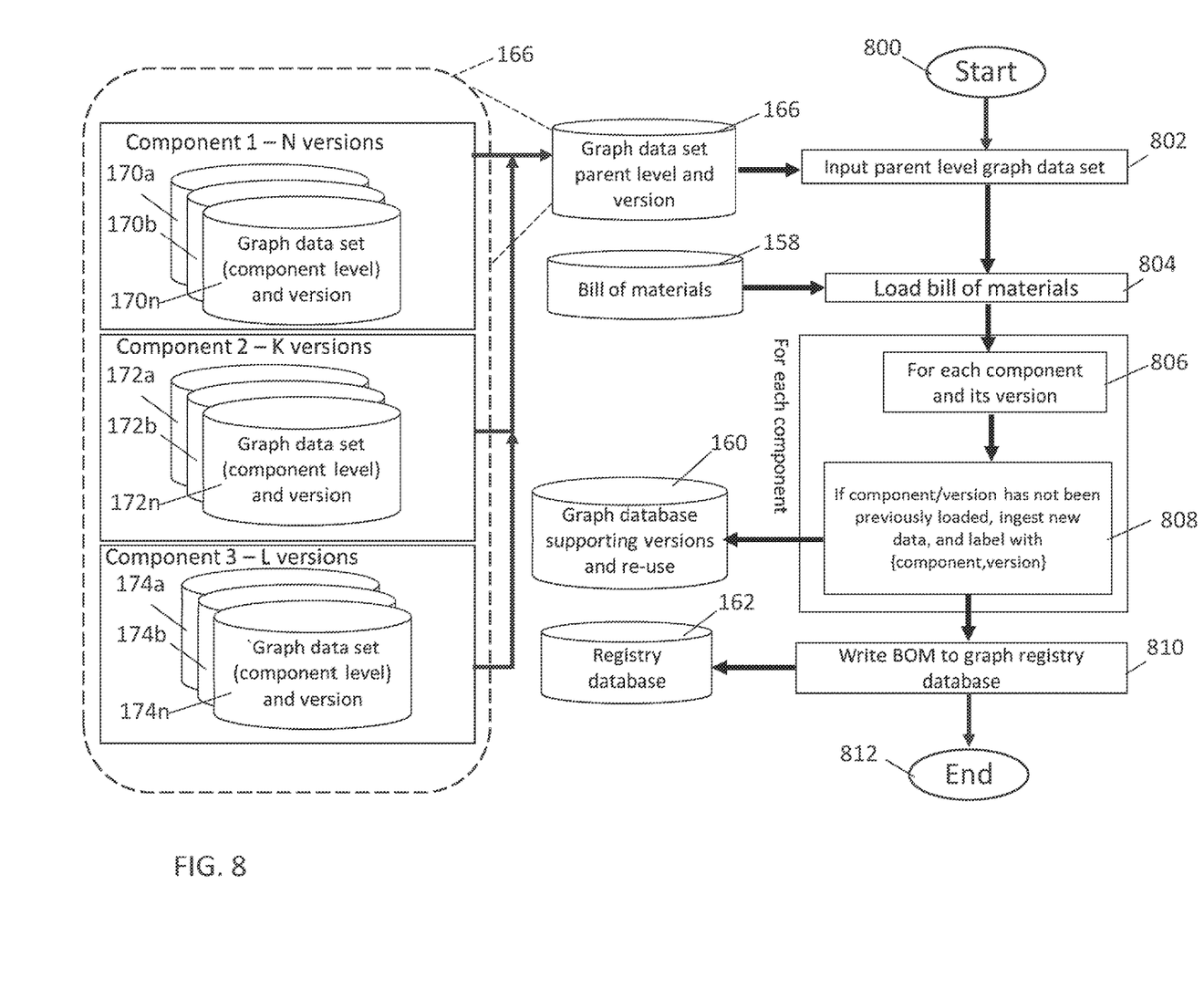
FIG. 8 is a flow diagram illustrating a method of stitching together a hierarchical graph representing different independent generated graph data sets according to a non-limiting embodiment of the invention.

Referring now to FIG. 8, a method of stitching together a hierarchical graph representing different independent generated graph data sets is illustrated according to a non-limiting embodiment of the invention. The method begins at operation 800, and at operation 802 a parent level graph set is input to the EDA data processing system 100. In one or more non-limiting embodiments, a version graph database 166 stores graph data set of parent level components and/or child level components. In the example illustrated in FIG. 8, the version graph database 166 stores several different versions 170a-170n of graph data sets for a first component, several different versions 172a-172n of graph data sets for a second component, and several different versions 174a-174n of graph data sets for a third component. Although graph data sets for three components are illustrated, graph data sets for more or fewer components can be included without departing from the scope of the invention.

Assembly of hierarchical graphs occurs as follows: At operation 804, the EDA data processing system 100 loads in to memory a bill-of-materials (BOM) which specifies a list of hierarchical components and corresponding versions thereof. For each hierarchical component H_i and version thereof v_i specified within the BOM, at step 806, a check is performed to determine if H_i version v_i has already been loaded in to memory. If not, then in step 808, independently generated graph data set corresponding to H_i version v_i is loaded in to memory and assembled in to the current hierarchical graph. This process creates a hierarchical graph composted of different independently generated graph data sets having the proper versions. In step 810 along with said hierarchical graph, the BOM which was used to generate said hierarchical graph is stored in a registry, which can be referenced in order to determine the composition of said hierarchical graph. For example, a design engineer may query said registry to know which hierarchical graphs contain a particular version V_j of hierarchical component H_j.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An electronic design automation (EDA) data processing system comprising:
    a version graph database configured to store a plurality of different versions of graph data sets, each graph data set corresponding to a respective circuit component located at a given hierarchical level of a semiconductor chip design and each graph data set tagged with a version identifier (ID) indicating the version thereof; and
    a controller in signal communication with the version graph database, the controller configured to determine a hierarchical circuit included in the semiconductor chip and to determine a plurality of targeted circuit components that define the hierarchical circuit,
    wherein the controller determines targeted graph data sets from the versions graph database that correspond to the targeted circuit components, and obtains the targeted graph data sets having matching version IDs such that the targeted graph data sets are the same version.

2. The EDA data processing system of claim 1, wherein the controller stitches together the targeted graph data sets to generate a hierarchical graph representing the hierarchical circuit.

3. The EDA data processing system of claim 2, wherein a first targeted circuit component among the targeted circuit components is located at a first hierarchical level and a second targeted circuit component among the targeted circuit components is located at a second hierarchical level different from the first hierarchical level.

4. The EDA data processing system of claim 3, wherein the first hierarchical level is a parent level and the second hierarchical level is a child level that is lower than the parent level.

5. The EDA data processing system of claim 3, wherein the controller performs at least one test diagnostic on the hierarchical graph having the same versions of the targeted graph data sets.

6. The EDA data processing system of claim 5, wherein the at least one test diagnostic is selected from a group comprising a static timing analysis, a statistical timing analysis, and a power analysis.

7. The EDA data processing system of claim 3, wherein the controller stores the hierarchical graph having the same versions of the targeted graph data sets in a version graph database.

8. A computer implemented method for diagnosing a semiconductor chip design, the method comprising:
    generating a graph data set corresponding to a respective circuit component located at a given hierarchical level of a semiconductor chip design;
    tagging the graph data set with a version identifier (ID) indicating a version of the graph data set;
    storing, in a version graph database, the graph data set with the version identifier (ID) such that a plurality of different versions of graph data sets are stored in the version graph database;
    determining, via a controller, a hierarchical circuit included in the semiconductor chip and determining a plurality of targeted circuit components that define the hierarchical circuit;
    determining, via the controller, targeted graph data sets from the versions graph database that correspond to the targeted circuit components, and obtaining, via the controller, the targeted graph data sets having matching version IDs such that the targeted graph data sets are the same version; and
    stitching together the targeted graph data sets, via the controller, to generate a hierarchical graph representing the hierarchical circuit.

9. The method of claim 8, wherein a first targeted circuit component among the targeted circuit components is located at a first hierarchical level and a second targeted circuit component among the targeted circuit components is located at a second hierarchical level different from the first hierarchical level.

10. The method of claim 9, wherein the first hierarchical level is a parent level and the second hierarchical level is a child level that is lower than the parent level.

11. The method of claim 10, wherein the controller performs at least one test diagnostic on the hierarchical graph having the same versions of the targeted graph data sets.

12. The method of claim 11, wherein the at least one test diagnostic is selected from a group comprising a static timing analysis, a statistical timing analysis, and a power analysis.

13. The method of claim 9, wherein the controller stores the hierarchical graph having the same versions of the targeted graph data sets in a version graph database.

14. A computer program product for diagnosing a semiconductor chip design, the computer program product comprising a computer readable storage medium having program instructions embodied therewith, the program instructions executable by a processor to perform a method comprising:

generating a graph data set corresponding to a respective circuit component located at a given hierarchical level of a semiconductor chip design;

tagging the graph data set with a version identifier (ID) indicating a version of the graph data set;

storing, in a version graph database, the graph data set with the version identifier (ID) such that a plurality of different versions of graph data sets are stored in the version graph database;

determining, via a controller, a hierarchical circuit included in the semiconductor chip and determining a plurality of targeted circuit components that define the hierarchical circuit; and determining, via the controller, targeted graph data sets from the versions graph database that correspond to the targeted circuit components, and obtaining, via the controller, the targeted graph data sets having matching version IDs such that the targeted graph data sets are the same version.

15. The computer program product of claim 14, further comprising stitching together the targeted graph data sets, via the controller, to generate a hierarchical graph representing the hierarchical circuit.

16. The computer program product of claim 15, wherein a first targeted circuit component among the targeted circuit components is located at a first hierarchical level and a second targeted circuit component among the targeted circuit components is located at a second hierarchical level different from the first hierarchical level.

17. The computer program product of claim 16, wherein the first hierarchical level is a parent level and the second hierarchical level is a child level that is lower than the parent level.

18. The computer program product of claim 14, wherein the controller performs at least one test diagnostic on the hierarchical graph having the same versions of the targeted graph data sets.

19. The computer program product of claim 18, wherein the at least one test diagnostic is selected from a group comprising a static timing analysis, a statistical timing analysis, and a power analysis.

20. The computer program product of claim 16, wherein the controller stores the hierarchical graph having the same versions of the targeted graph data sets in a version graph database.

* * * * *